A. G. DEWEY.
IMPLEMENT FRAME.
APPLICATION FILED MAY 9, 1908.
935,144.
Patented Sept. 28, 1909.
2 SHEETS—SHEET 2.
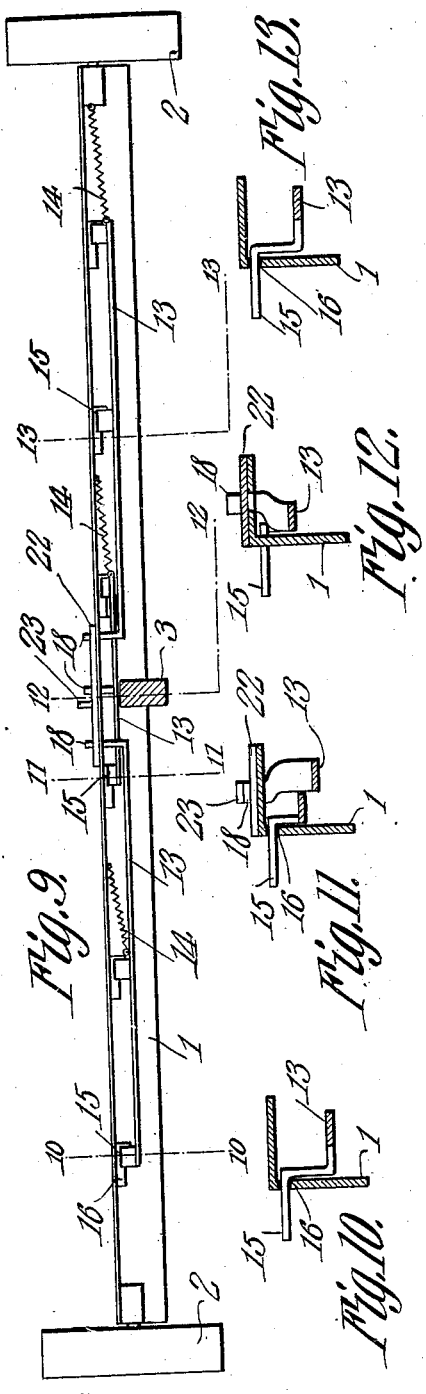
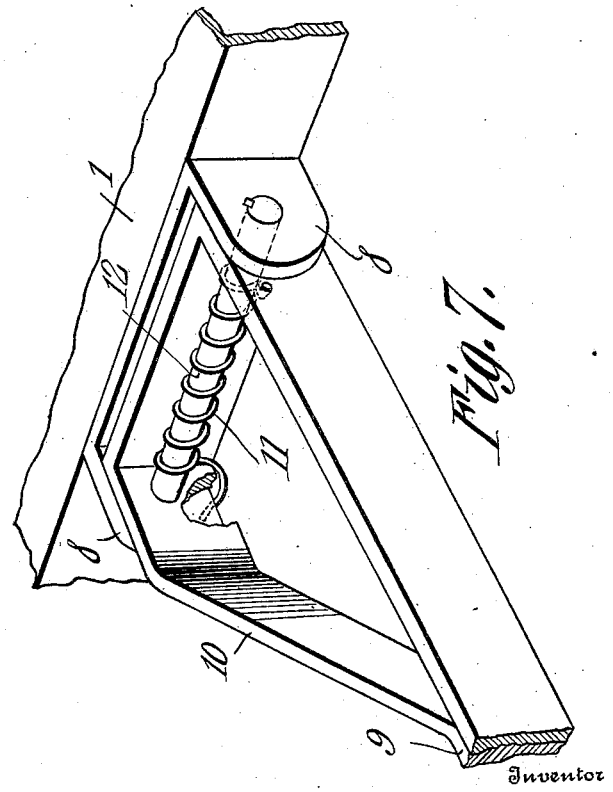
Witnesses
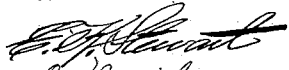
Inventor
Andrew G. Dewey.
By 
Attorneys

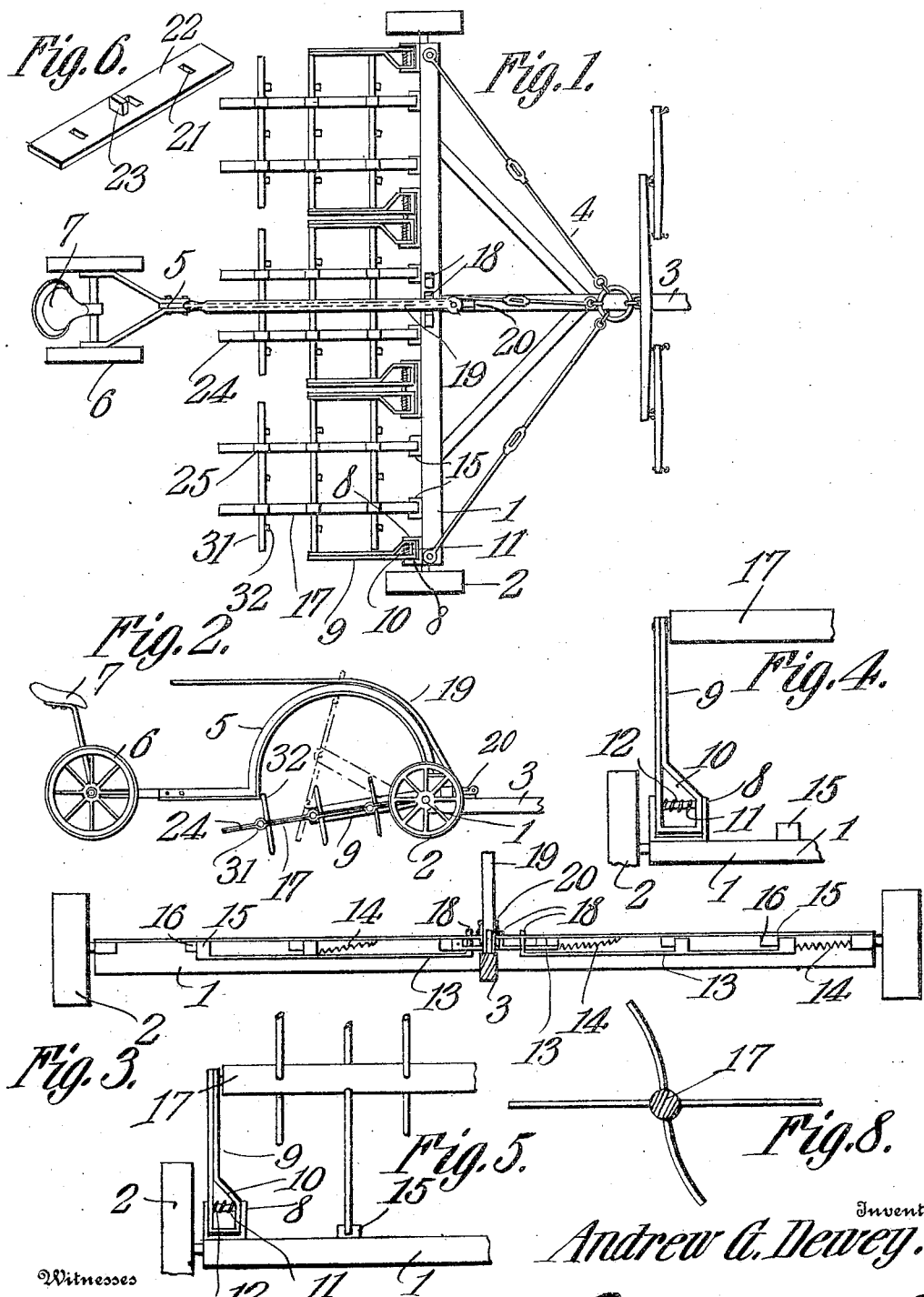

UNITED STATES PATENT OFFICE.

ANDREW GULICK DEWEY, OF CARBONDALE, ILLINOIS.

IMPLEMENT-FRAME.

935,144.  Specification of Letters Patent.  Patented Sept. 28, 1909.

Application filed May 9, 1908. Serial No. 431,949.

*To all whom it may concern:*

Be it known that I, ANDREW GULICK DEWEY, a citizen of the United States, residing at Carbondale, in the county of Jackson and State of Illinois, have invented a new and useful Implement-Frame, of which the following is a specification.

This invention has relation to frames for agricultural implements and consists in the novel construction and arrangement of its parts as hereinafter shown and described.

The object of the invention is to provide a frame of the character indicated, the parts of which are so arranged that the earth-engaging members carried by the frame may be effectually used for harrowing, pulverizing or rolling the soil, and the said frame is so constructed that when a gang of earth-engaging members is employed they may be held in relatively fixed position, and any particular member of the earth-engaging members may be permitted to rotate at will, in order that the said member may be freed of trash, or the said members may be so connected up that they may rotate in unison when such movement is desired.

In the accompanying drawings:—Figure 1 is a plan view of the frame. Fig. 2 is a side view of the same. Fig. 3 is a front elevation of the frame, showing the tongue in section. Fig. 4 is a detail plan view of a portion of the frame. Fig. 5 is a detail plan view of a portion of the frame, showing a rake member attached thereto. Fig. 6 is a detail perspective of a plate which may be employed upon the frame for permitting the ground-engaging members to rotate in unison. Fig. 7 is an enlarged perspective view, showing an arm pivoted to the frame axle. Fig. 8 is a sectional view of the rake shaft, as shown in Fig. 5. Fig. 9 is an enlarged front elevation of the frame. Fig. 10 is a transverse sectional view of the frame axle, cut on the line 10—10 of Fig. 9. Fig. 11 is a transverse sectional view of the frame axle, cut on the line 11—11 of Fig. 9. Fig. 12 is a transverse sectional view of the frame axle, cut on the line 12—12 of Fig. 9. Fig. 13 is a transverse sectional view of the frame axle, cut on the line 13—13, of Fig. 9.

The frame consists of the axle 1, which is mounted upon the supporting wheels 2. The guiding tongue is attached at its rear end to the said axle, and the draft means 4 lies over the tongue 3 and is connected with the axle 1. The forward end of the reach bar 5 is connected pivotally with the axle 1, and the rear portion of said bar is supported by the truck 6. An operator's seat 7 is mounted upon the truck 6. Lugs 8 are attached to the rear side of the axle 1, and the forward ends of the arms 9 are pivotally mounted between the said lugs. The forward ends of the said arms 9 are open as at 10, and receive the coiled springs 11, which surround the pivot pins 12 and are fixed at one end to the arms 9, and at their opposite ends bear against the lugs. The said springs 11 are under tension with a tendency to hold the rear ends of the arms 9 in elevated positions.

The bars 13 are carried by the axle 1, and may move longitudinally with relation to the axle, and the springs 14 are connected at one end with the bars 13, and at their opposite ends are connected with the axle 1. Each bar 13 carries a pair of lugs 15, which project through the slots 16 provided in the axle, and which normally lie in the path of rotation of parts of the earth-engaging members 17, pivotally mounted between the rear ends of the arms 9. The springs 14 hold the lugs 15 in such positions. The earth-engaging members, as illustrated in Figs. 1 and 2, are in the form of harrows, while the earth-engaging member, as illustrated in Fig. 5, is in the form of a rake. Each of the bars 13 is provided with an upstanding lug 18, which projects above the upper surface of the axle 1. A lever 19 is pivoted to the hinge 20, which, in turn, is connected to the tongue 3. One member of the said hinge 20 is arranged to swing vertically with relation to the tongue, while the lever 19 may swing laterally upon the hinge. Thus the lever may be brought into contact with a lug 18 of any particular bar 13, for the purpose of shifting the same longitudinally against the tension of its attached spring 14, whereby the lug 15 carried by the said bar will be moved out of the path of rotation of the earth-engaging member 17, and said member will be rendered free for rotation. Should it be desired at any time, however, to have all of the earth-engaging members 17 rotate simultaneously, the lugs 18 of the bars 13 are passed through the openings 21 in the plate 22, whereby all of the said bars 13 are connected together, and the lever 19 may be operated against the lug 23 mounted upon the plate 22.

Thus it will be seen that a frame is provided which is adapted to carry earth-engaging members, and which may be so manipulated as to permit any earth-engaging member to rotate at any desired time. Also the arms 9 which carry the earth-engaging members, are subjected to spring tension, which tends to hold their free ends in elevated positions. Consequently, as the rear or free ends of the arms are lowered during the time that the earth-engaging members are rotating, the tension of the springs 11 is increased, and the lowering movement of the arms cushioned, or retarded, whereby the earth-engaging member, at the end of its rotary movement, is not violently thrown against the ground, but is gently positioned upon the same.

The earth-engaging member, as shown in Figs. 1 and 2, includes in part the flexible sheet metal beams 24. The teeth 32 are mounted upon the cross beams 31, which in turn are attached to the beams 24.

What is claimed is:—

1. An implement frame comprising a wheel-mounted axle, arms pivotally connected thereto, a rotary earth-engaging member journaled between the arms, lugs carried by the axle and projecting into the path of rotation of the earth-engaging member, and means for removing said lugs from the path of rotation of said member.

2. An implement frame comprising a wheel-mounted axle, spring-actuated arms pivotally connected thereto, a rotary earth-engaging member journaled between the arms, lugs carried by the axle and projecting into the path of rotation of the earth-engaging member, and means for removing said lugs from the path of rotation of said members.

3. An implement frame comprising a wheel-mounted axle, arms pivotally connected thereto, a rotary earth-engaging member journaled between the arms, a bar slidably mounted upon the axle and having lugs which project into the path of rotation of the earth-engaging member, and means for shifting said bar upon the axle to move the lugs out of the path of rotation of the earth-engaging member.

4. An implement frame comprising a wheel-mounted axle, arms pivotally connected thereto, a rotary earth-engaging member journaled between the arms, a bar slidably mounted upon the axle and having lugs which normally project into the path of rotation of the earth-engaging member, a reactionary spring attached to the bar, and means for shifting the bar against the tension of said spring.

5. An implement frame comprising a wheel-mounted axle, a series of rotary earth-engaging members connected therewith, shiftable lugs carried by the axle and projecting into the paths of rotation of the earth-engaging members, and means for removing the lugs from the path of rotation of any particular member of the series.

6. An implement frame comprising a wheel-mounted axle, a series of rotary earth-engaging members connected therewith, shiftable lugs carried by the axle and projecting into the paths of rotation of the earth-engaging members, a detachable means for connecting the lugs together for simultaneous movement, and means for shifting the last said means.

In testimony that I claim the foregoing as my own, I have hereto affixed my signature in the presence of two witnesses.

ANDREW GULICK DEWEY.

Witnesses:
WILLIAM HENRY HUDSON,
JAMES EDMUND ETTER.